United States Patent [19]
Taylor

[11] 3,796,114
[45] Mar. 12, 1974

[54] TRANSMISSION CONTROL CIRCUIT
[75] Inventor: Eugene D. Taylor, Kenosha, Wis.
[73] Assignee: J. I. Case Company, Racine, Wis.
[22] Filed: July 3, 1972
[21] Appl. No.: 268,464

[52] U.S. Cl. .................. 74/761, 192/109 F, 74/740
[51] Int. Cl. ... F16h 57/10, F16h 37/00, F16d 25/12
[58] Field of Search ..................... 74/761; 192/109 F

[56] References Cited
UNITED STATES PATENTS

| 3,469,472 | 9/1969 | Bislew | 74/761 |
| 3,618,728 | 11/1971 | McPherson | 192/109 F X |
| 3,042,165 | 7/1962 | Yokel | 192/109 F X |
| 3,352,394 | 11/1967 | Longshore | 192/109 F X |
| 3,605,507 | 9/1971 | Ishiharg et al. | 74/761 |

Primary Examiner—Arthur T. McKeon
Attorney, Agent, or Firm—Dressler, Goldsmith, Clement & Gordon, Ltd.

[57] ABSTRACT

The disclosure of this application relates to a hydraulic control circuit for a plural speed drive transmission that incorporates fluid operated devices for conditioning the transmission in a plurality of speeds at least one of which is in the reverse direction of the others. The hydraulic control circuit incorporates two way check valve means between first and second conduits that are respectively connected to fluid operated devices which are engaged when the transmission is operating in the lowermost forward direction and in the reverse direction.

The two way check valve means accommodates limited flow from one conduit to the other after pressurization of the one conduit when the other conduit is connected to a reservoir to delay the pressurization of a fluid actuated device and produce smooth engagement of the transmission.

5 Claims, 2 Drawing Figures

3,796,114

TRANSMISSION CONTROL CIRCUIT

BACKGROUND OF THE INVENTION

The present invention relates generally to transmissions of the variable speed type and more particularly to an improved hydraulic circuit for such transmissions.

A transmission hydraulic control circuit to which this invention pertains is disclosed in Bislew U.S. Pat. No. 3,469,472 and the disclosure of this patent, not inconsistent with the present disclosure, is incorporated herein by reference.

The hydraulic control circuit in the above patent includes a plurality of valves that are capable of selectively supplying pressurized fluid to a plurality of fluid operated devices incorporated into a planetary speed transmission unit that cooperates with a sliding gear or range changing unit of the transmission. In the transmission illustrated in the patent, the planetary speed changing unit incorporates a first pair of friction fluid operated devices or brakes that are interposed between the housing and portions of the transmission unit and a second pair of friction fluid operated devices or clutches that are interposed between planetary speed changing unit and the sliding gear speed changing unit of the transmission. In the planetary speed changing unit, the first or lowermost forward speed is produced by engaging one brake and one clutch to connect a portion of the planetary speed changing unit to the transmission housing while interconnecting another portion to the output shaft for the planetary unit. When operating the speed changing unit in the reverse direction, the other of the two brakes is engaged while one of the two clutches is engaged to produce reverse rotation of the output shaft for the planetary unit with respect to the input shaft.

The hydraulic circuit disclosed in the above mentioned patent also incorporates mechanisms that insure that the fluid pressure is at a predetermined level before any of the fluid operated friction devices can be engaged.

In some transmission units of this type, the input shaft to the transmission extends through the entire transmission and through the housing as the rear end where a power take-off unit is connected thereto so that auxiliary equipment may be operated while the transmission is in a neutral condition. In units of this type, it has been found that rapid engagement of the fluid operated devices or brakes may result in torsional shock loads being transmitted to the power take-off unit which could cause damage to the shaft and the attached equipment. It will be appreciated that when either of the fluid actuated devices or brakes are actuated, a portion of the planetary transmission unit becomes coupled to the housing to prevent further movement. The torsional shock loads result from the rapid pressurization of the fluid operated devices must necessarily occur since the fluid must be at a rather high pressure to insure complete engagement of the devices.

SUMMARY OF THE INVENTION

The present invention relates to a simple device that is incorporated in the hydraulic control circuit disclosed in the above mentioned patent and the device produces a delay in the pressurization of a fluid operated device when the transmission unit is being conditioned for operation in the lowermost forward direction and in the reverse direction.

The hydraulic control circuit of the present invention is incorporated into a variable speed transmission that includes a plurality of fluid operated devices. The circuit incorporated mechanism for delaying the build-up of pressure to a fluid operated device that is operated or engaged in the lowermost forward direction and in the lowermost reverse direction.

The hydraulic control circuit includes first and second conduits that are respectively connected to first and second fluid operated devices which are respectively actuated when the transmission is conditioned for operation in the lowermost forward direction and in the reverse direction. Control valve means are connected to the conduits and a reservoir and pump means to supply fluid under pressure to the devices by selective actuation of the control valve means.

The mechanism for delaying the build-up of pressure in a fluid operated device includes check valve means that interconnects the conduits and accommodates limited flow of fluid from one of the conduits to the other during initial supply of fluid under pressure in certain conditions of operation of the transmission, to thereby delay the pressurization in the associated fluid operated device.

In the specific embodiment illustrated, the valve means consists of a two-way check valve that is defined by a vertical tube which has an opening of common diameter throughout its length with a first coupling or means on the upper end of the tube connecting the tube through a reduced diameter opening to the first conduit. A second coupling or means on the lower end of the tube also has a reduced diameter opening connecting the tube to the second conduit and a ball is supported for free movement in the tube. The ball has a diameter less than the diameter of the opening in the tube and greater than the reduced diameter openings in the respective couplings on opposite ends of the tube. The tube is positioned in a vertical position with the first conduit, which is connected to the fluid operated device that is engaged in the forward direction, connected to the upper end of the tube while the second conduit, which is connected to the fluid operated device that is actuated in the reverse direction, is connected to the lower end of the tube.

With the position of the two-way check valve means as described, the ball or member will normally be located at the bottom of the tube to block flow between the tube and the second conduit. However, should fluid under pressure be supplied to the second conduit and the first conduit be connected to the reservoir, the initial rise in pressure of the fluid will be transmitted through the lower reduced diameter opening to the ball to raise the ball within the tube. While the ball is intermediate opposite ends of the tube, a limited amount of fluid can flow from the second conduit to the first conduit through the annular area defined between the periphery of the ball and the internal surface of the tube.

The flow of fluid through the tube will be smaller then the size of the reduced diameter opening at either end of the tube so that there will be a pressure rise of the fluid received in the tube. This pressure rise will cause the ball to move upwardly and ultimately engage tthe coupling at the upper end of the tube and block further flow of fluid from the tube to the first conduit. Thereafter, the pressure of the fluid in the second conduit will be at full system pressure and actuate the fluid operated device.

In the specific arrangement disclosed in the mentioned patent, the fluid operated device or brake that is engaged when the transmission is operated in the reverse direction and is also engaged each time the transmission is moved to a neutral condition. Thus, according to another aspect of the invention, the two-way check valve is located in a vertical position and the fluid operated device or brake that is operated in the reverse direction for the transmission is connected to the lower end of the tube while the fluid operated device or brake that is engaged in the lowermost forward direction is connected to the upper end. With this arrangement, each time the transmission is moved to a neutral condition, the two-way check valve becomes operative to allow a small amount of fluid from the second conduit connected to the second fluid operated device or brake to flow through the check valve and into the first conduit to be returned to the reservoir. However, should the transmission be shifted from the first forward speed to the second forward speed or the third forward speed, the ball in the two-way check valve will remain at the lower end of the tube so that the full pressure of the fluid is available immediately for engagement of the transmission.

BRIEF DESCRIPTION OF SEVERAL VIEWS OF DRAWINGS

FIG. 1 is a schematic view of a transmission having the hydraulic control circuit of the present invention incorporated therein; and FIG. 2 is a fragmentary schematic of the hydraulic control circuit shown in FIG. 1.

DETAILED DESCRIPTION

Figure 1:
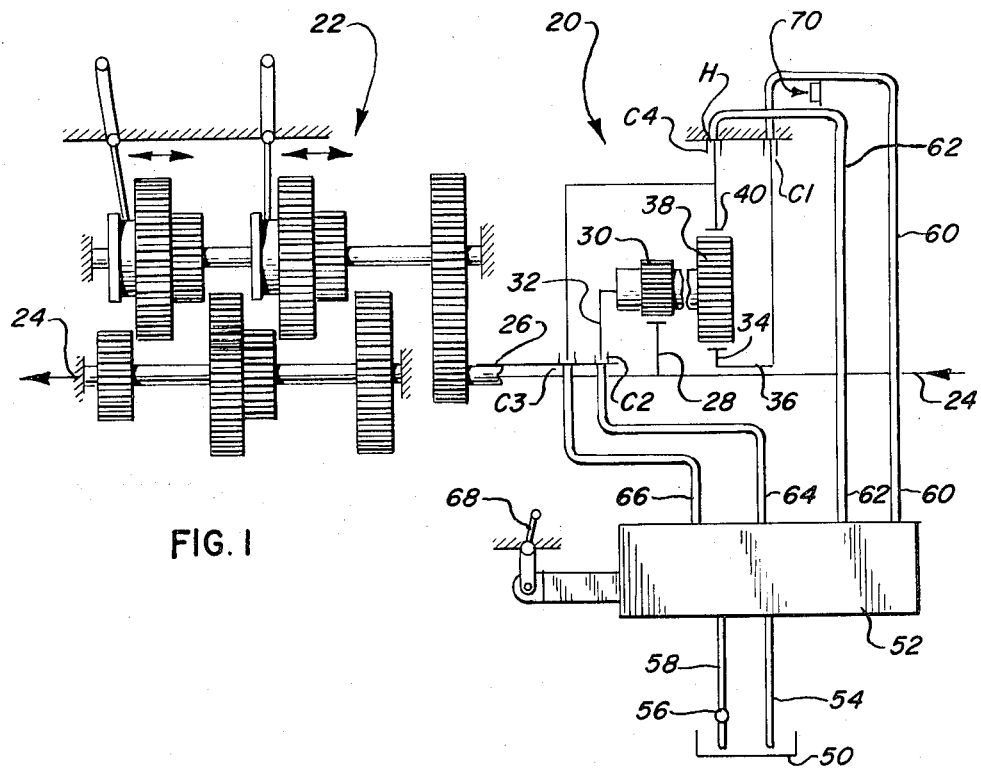

While this invention is susceptible of embodiment in many different forms, there is shown in the drawings and will herein be described in detail one embodiment, with the understanding that the present disclosure is to be considered as an exemplification of the principles of the invention and is not intended to limit the invention to the embodiment illustrated.

With particular reference to the drawings, FIG. 1 generally schematically discloses a transmission comprising a planetary transmission unit 20 annd sliding gear transmission unit 22. Planetary transmission unit or variable speed drive unit 20 includes input shaft 24, which is driven by a power source (not shown) and output shaft 26. Variable speed transmission unit 20 also includes first sun gear 28 fixedly secured to input shaft 24 with sun gear 28 in constant mesh with a first set of planetary gears 30 (only one being shown) carried by planetary carrier 32. Variable speed transmission 20 further includes second sun gear 34 fixedly secured to hollow shaft 36 with sun gear 34 being in constant mesh with a second set of planetary gears 38 (only one being shown), also carried by planetary carrier 32. Ring gear 40 also forms part of the variable speed transmission 20 and is in constant mesh with planetary gears 38.

Variable speed transmission 20 is adapted to be driven at a plurality of different forward and reverse speeds through the selective interconnection of various portions of the transmission to output member 26. For this purpose, hollow shaft 36 is adapted to be fixed to transmission housing H through first fluid operated friction device or brake C1. Planetary carrier 32 and ring gear 40 are capable of being operatively interconnected with output shaft 26 through second and third fluid operated friction devices or clutches C2 and C3, respectively, while ring gear 40 is adapted to be fixed to housing H through fourth fluid operated friction device or brake C4. For purposes of simplicity, only portions of the housing are represented in schematic and are commonly identified by the reference numeral H, it being understood that the housing enclosing the entire transmission including the units 20 and 22.

As will be understood, to those versed in the art, each friction device is engaged by supplying fluid under pressure to a movable pressure plate, (not shown) which engages the relatively movable elements of the fluid operated devices with each other. In the illustrated transmission, by proper selection of a respective pair of fluid operated devices, the output shaft 26 may be driven at any one of three forward speeds with respect to input shaft 24 and also be driven in one reverse speed with respect to input shaft 24.

In the illustrated transmission, a first forward speed for a vehicle having the transmission incorporated therein is obtained by frictionally engaging fluid operated devices C1 and C2 to fix sun gear 36 to housing H and planetary carrier 32 to output shaft 26 and drive output shaft 26 through sun gear 28 and planet gear 30 and 34. The second or intermediate forward speed is achieved by frictionally engaging fluid operated friction devices C1 and C3 which will connect hollow shaft 36 and sun gear 34 to housing H and rotate output shaft 26 through ring gear 40 and planet gears 38 rotating about fixed sun gear 34. The third or high speed is accomplished by frictionally engaging fluid operated devices or clutches C2 and C3 to obtain a direct driving connection between an input and output shafts of the planetary transmission unit. Reverse speed or direction is produced by frictionally engaging fluid operated device or clutch C2 to interconnect planetary carrier 32 with output shaft 26 and engagement of fluid operated device or brake C4 to discontinue rotation of ring gear 40.

The fluid for engagement of the respective fluid operated devices C1, C2, C3 and C4 is delivered by a hydraulic circuit that includes reservoir 50 connected to control valve means 52 through conduit 54. Fluid under pressure is delivered to control valve means 52 by pump 56 located in conduit 58. Control valve means 52 is connected through first and second conduits 60 and 62 to fluid operated devices or brakes C1 and C4 while being connected to fluid operated devices or clutches C2 and C3 through conduits 64 and 66. By proper actuation of control valve means 52 through control lever 68, fluid can be selectively supplied to two of the conduits 60–66 while the remaining conduits are connected to the reservoir through conduit 54, again as explained in more detail in the above mentioned patent.

Output shaft 26 of the planetary drive unit in the illustrated embodiment is connected to a sliding gear or range changing unit 22 which is capable of producing four different speeds for each driving condition of the planetary unit thereby producing 12 different forward speeds and four different reverse speeds of the vehicle. Since sliding gear changing unit 22 forms no part of the present invention, no detailed description is necessary.

Transmissions of this type are generally incorporated into heavy-duty industrial or agricultural vehicles and the vehicles normally are designed for operation of auxiliary equipment. It is therefore, necessary to have an auxiliary output from input shaft to drive the auxiliary equipment. To reduce the cost of the vehicle, it has become customary in certain areas of the industry to have input shaft 24 extend through the entire transmission and terminate outside the transmission housing at the rear end of the vehicle where a power take-off unit is connected to drive the axuiliary equipment. With such an arrangement, the power take-off unit may be operated at any time the power source is working while the transmission unit can be separately engaged or disengaged.

While such a transmission has found a remarkable degree of commercial success, some problems have been encountered in the development of torsional shock loads to the power take-off unit while the transmission is being conditioned for operation at the various speeds.

It has been found that the torsional shock loads develop when either of the fluid operated devices or brakes C1 and C4 are engaged.

The torsional shock loads result from the rapid pressurization of the fluid operated devices or brakes C1 and C4, which must necessarily occur since the pressure of the fluid must be rather high to insure complete engagement of the fluid operated devices.

According to the present invention, the hydraulic circuit for supplied fluid under pressure to the respective fluid operated devices incorporates two way check valve means that accommodates limited flow of fluid from one of the first and second conduits, respectively connected to the brakes C1 and C4, so that the conduits are momentarily interconnected during the initial supply of fluid under pressure to one of the conduits to thereby delay the rise in pressure in the associated fluid operated device. The check valve means is very simple in construction and can readily be incorporated into existing hydraulic circuits for transmissions in a very short period of time.

Figure 2:
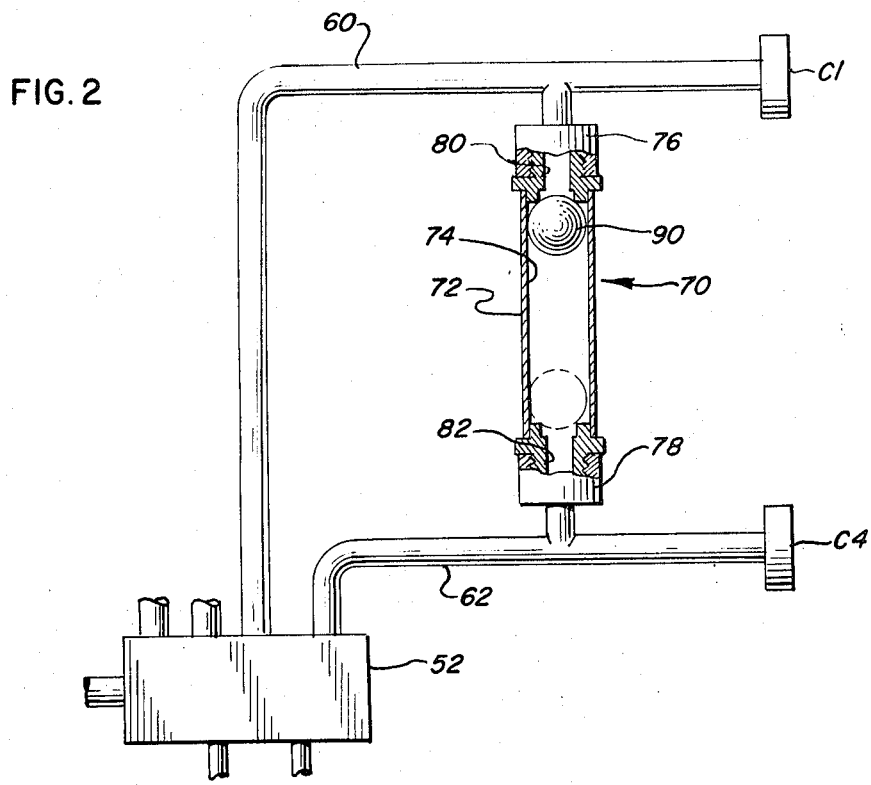

Two way check valve means 70 is shown in detail in FIG. 2 and includes a vertical tube 72 having a constant diameter opening 74 between opposite ends thereof along its length with first means or coupling 76 connected to the upper end of tube 72 and second means or coupling 78 connected to the lower end of tube 72. Coupling or first means 76 has a reduced diameter opening 80 which is smaller than the diameter of elongated opening 74 defined by tube 72 and reduced diamter opening 80 places tube 72 in communication with first conduit 60. Likewise, second means or coupling 78 has reduced diameter opening 82 which again is less than the diameter of opening 74 and places the lower end of tube 72 in communication with second conduit 62. Two way check valve means also includes spherical ball or member 90 that is movable axially within tube 72 and has a diameter less than the diameter of opening 74 while being greater in diameter than the diameter of reduced diameter portions 80 and 82 respectively defined in coupling 76 and 78. The differences in diameter between opening 74 and ball 90 define an annular zone or opening which places conduits 60 and 62 in communication with each other whenever ball 90 is spaced from either of the couplings 76 and 78. However, when ball 90 is forced against either coupling 76 or 78 that define ball seats by the fluid under pressure in either conduit 62 or 60, the ball will prevent flow of fluid through two way check valve 70.

Before explaining the operation of the device, it should be noted that in the hydraulic circuit disclosed in the above mentioned patent, the circuit is designed so that fluid operated device or brake C4 is actuated each time the planetary transmission unit 20 is moved to a neutral condition. The engagement of the brake C4 each time the transmission unit is neutralized is primarily to prevent further movement of any of the carriers or gears when the transmission is in a neutral condition.

With the control valve means 52 positioned for a neutral condition for the transmission unit, fluid under pressure is being supplied to conduit 62 and fluid operated device or brake C4 is engaged to fix ring gear 40 to transmission housing H. In this condition, the pressure of the fluid in conduit 62 is received into tube 72 through reduced diameter opening 82 and ball 90 is held in the solid line position shown in FIG. 2 wherein the flow of fluid from tube 72 to conduit 60 is blocked.

To condition the transmission unit for operation in the lower or first forward speed, the flow of fluid to fluid operated device C4 is interrupted by connecting conduit 62 to reservoir 50. At the same time, fluid under pressure is supplied to fluid operated devices C1 and C2. The fluid under pressure directed to fluid operated device C1 through conduit 60 and the simultaneous connection of conduit 62 to reservoir 50 will produce a downward force on ball 90 causing the ball to move from coupling 76 towards coupling 78. During this downward movement, a small amount of fluid flows through the annunlar zone between ball 90 and opening 74 to produce a delay in pressure rise of the fluid delivered to fluid operated device C1. This delay in pressure rise of fluid will produce a smooth engagement for the device or brake which will prevent torsional shock loads from being transmitted to the power take-off unit.

It should be noted that the positioning and interconnection of the double-ended or two-way check valve into the hydraulic circuit will not effect the shifting of the transmission unit from the first to the second and third forward speeds. Since the fluid operated device or brake C4 is not actuated in any of the forward speeds, the shifting of the transmission unit from the first to the second forward speed will result in immediate full pressure of the fluid from pump 56 to the respective fluid operated devices. This comes about as a result of positioning of check valve means 70. It will be noted that when fluid operated device C1 has been engaged, ball 90 will be located in the dotted line position of FIG. 2 and conduit 62 will be connected to reservoir 50. The shifting of the transmission unit to the other forward speeds with direct fluid under pressure to two of the fluid operated devices C1, C2 and C3 while fluid operated device C4 remains connected to the reservoir. Thus, there can be no flow of fluid from conduit 60 to conduit 62 during these shifting operations. It should also be noted that the gravitational forces on ball 90 will retain the ball in the dotted line position of FIG. 2 when no fluid is being supplied to either conduit 60 or 62.

When the transmission unit is in a neutral condition or conditioned for operation in the reverse direction, fluid under pressure is directed to the conduit 62 to pressure fluid operated device C4 which will again be delayed by allowing the small amount of fluid to pass through two way check valve from conduit 62 to conduit 60 which is at this time connected to reservoir 50.

It will be appreciated that any delay in the pressure rise when fluid operated device C4 is engaged and disengaged may readily be incorporated into the system by proper selection of the desired parameters. The time delay in pressure rise will be dependent upon the length of tube 72 between the two couplings 76 and 78 which define check valve means, the relationship of the diameter of ball 90 to the diameter of opening 74 in tube 72 and the diameter of reduced diameter openings 80 and 82 in the respective couplings on opposite ends of the tube.

I claim:

1. In a variable speed transmission having a plurality of fluid operated mechanisms with a first of said mechanisms being operative when said transmission is engaged in a forward direction and a second mechanism being operative when said transmission is engaged in a reverse direction, a hydraulic circuit for supplying fluid to said mechanisms, said circuit including a source of fluid; pump means supplying fluid under pressure from said source; a control valve; conduit means between said source, pump means, control valve and fluid operated mechanisms, said conduit means including first and second conduits respectively leading to said first and second mechanisms; and check valve means between said first and second conduits, said check valve means accommodating limited flow of fluid from one of said first and second conduits to the other of said first and second conduits during initial supply of fluid under pressure to said one of said first and second conduits to delay the pressure rise in the associated fluid operated mechanism, said check valve means including a tube extending vertically with a member vertically shiftable in said tube, said member normally being located in a lowermost position in said tube blocking flow of fluid in said tube.

2. The combination as defined in claim 1, in which said tube has a constant diameter opening along a major portion of its length and reduced diameter portions adjacent opposite ends; and in which said member has a diameter less than the diameter of the major portion of said opening and greater than the reduced diameter portions to accommodate flow while said member is spaced from said reduced diameter portions.

3. The combination as defined in claim 1, in which said member is a circular ball.

4. In a variable speed transmission having a plurality of fluid operated mechanisms with a first mechanism being operative by supplying fluid under pressure thereto to operate said transmisssion in a lowermost speed in the forward direction and a second mechanism being operative by supplying fluid under pressure thereto to operate said transmission in a reverse direction; and a hydraulic circuit for supplying fluid to said mechanisms, said circuit including first and second conduits respectively connected to said first and second mechanisms; control valve means connected to said conduits; a reservoir; pump means; means connecting said reservoir and pump means to said control valve means, said control valve means being operable to selectively connect said reservoir and pump means to said conduits; and valve means interconnecting said conduits, said valve means including a vertical tube having an opening of common diameter throughout its length, first means on the upper end of said tube and having a reduced diameter opening connecting said tube to said first conduit, second means on the lower end of said tube and having a reduced diameter opening connecting said tube to said second conduit, and a ball having a diameter less than said common diameter and greater than said reduced diameters, said ball being freely movable in said tube and normally being located adjacent said second means to block flow of fluid from said first conduit to said second conduit, said ball being vertically movable in said tube when said pump means is connected to said second conduit and said first conduit is connected to said reservoir to delay the pressure rise of the fluid supplied to said second mechanism.

5. A variable speed transmission as defined in claim 4, in which said ball is seated against the reduced diameter opening in said first means while fluid under pressure is being delivered to said second mechanism and in which said ball moves downward in said tube when said second conduit is connected to said reservoir.

* * * * *